United States Patent
Yee et al.

(10) Patent No.: US 8,755,813 B2
(45) Date of Patent: Jun. 17, 2014

(54) TV WHITE SPACE DEVICES USING STRUCTURED DATABASES

(75) Inventors: Jung Yee, Ottawa (CA); Vajira Samarasooriya, Ottawa (CA); Lingjie Li, Ottawa (CA)

(73) Assignee: Wi-Lan, Inc., Ottawa (CA)

( * ) Notice: Subject to any disclaimer, the term of this patent is extended or adjusted under 35 U.S.C. 154(b) by 0 days.

(21) Appl. No.: 13/498,106

(22) PCT Filed: Jul. 9, 2010

(86) PCT No.: PCT/CA2010/001081
§ 371 (c)(1),
(2), (4) Date: Apr. 19, 2012

(87) PCT Pub. No.: WO2012/003566
PCT Pub. Date: Jan. 12, 2012

(65) Prior Publication Data
US 2013/0103684 A1    Apr. 25, 2013

(51) Int. Cl.
*H04W 72/00* (2009.01)
(52) U.S. Cl.
USPC ....... 455/454; 455/464; 455/62; 707/E17.018
(58) Field of Classification Search
USPC .................. 455/454, 464, 62; 707/E1.0187
See application file for complete search history.

(56) References Cited

U.S. PATENT DOCUMENTS

| | | | |
|---|---|---|---|
| 6,301,477 B1 | 10/2001 | Lennert et al. | |
| 2008/0130519 A1 | 6/2008 | Bahl et al. | |
| 2008/0207136 A1 | 8/2008 | Tang et al. | |
| 2009/0196180 A1 | 8/2009 | Bahl et al. | |
| 2010/0330919 A1* | 12/2010 | Gurney et al. | 455/67.11 |
| 2011/0070838 A1* | 3/2011 | Caulfield | 455/62 |
| 2011/0143761 A1* | 6/2011 | Uusitalo et al. | 455/450 |
| 2011/0286401 A1* | 11/2011 | Wijting et al. | 370/329 |
| 2012/0184318 A1* | 7/2012 | Lee et al. | 455/515 |
| 2012/0185429 A1* | 7/2012 | Shu et al. | 707/609 |
| 2013/0078924 A1* | 3/2013 | Choudhury et al. | 455/62 |
| 2013/0185552 A1* | 7/2013 | Steer | 713/156 |

FOREIGN PATENT DOCUMENTS

WO    0223758 A1    3/2002

OTHER PUBLICATIONS

Marcus et al. Federal Communications Commission Spectrum Policy Task Force: Report of the Unlicensed Devices and Experimental Licenses Working Group. Nov. 15, 2002, 24 pages. Retrieved from http://web.archive.org/web/20041119020032/http://www.fcc.gov/sptf/files/E&UWGFinalReport.doc.

(Continued)

*Primary Examiner* — Danh Le
(74) *Attorney, Agent, or Firm* — Procopio, Cory, Hargreaves & Savitch LLP

(57) ABSTRACT

A two-level database structure for use by unlicensed TVBD devices operating in TV white space comprises a central database and local databases. The central database comprises two sub-database: the central licensed database which maintains information about all licensed TV devices and the central unlicensed database which maintains information about unlicensed wireless devices operating in TV spectrum. The local database is created by each TVBD device or TVBD network when it initiates and it stores information related to all transmitters in the local area including location, power transmission levels, operating schedule, sensing results, backup channel information. The local databases communicate with central database to query it about licensed usage of TV spectrum and register with central database. The local databases communicate with each other to exchange information about channel usage, sensing results, transmission patterns and other information that will allow the local databases to negotiate coexistence without central coordinator. The locally implemented negotiation prevents the overloading of the central database.

17 Claims, 2 Drawing Sheets

(56) References Cited

OTHER PUBLICATIONS

International Search Report for related PCT Application No. PCT/CA2010/001081, completed on Apr. 6, 2011 and mailed on Apr. 11, 2011, in 3 pages.

"Proposal by Google Inc. to Provide a TV Band Device Database Management Solution." Before the Federal Communications Commission, Washington, DC 20554. In the Matter of Proposals from Entities Seeking to Be Designated TV Band Device Database Managers, Unlicensed Operation in the TV Broadcast Bands. DA 09-2479. Jan. 4, 2010, 20 pages.

* cited by examiner

TV WHITE SPACE DEVICES USING STRUCTURED DATABASES

FIELD OF THE INVENTION

The invention relates to a system and method for creating and using structured databases for unlicensed applications operating in the TV spectrum.

BACKGROUND OF THE INVENTION

In the recent years there has been a significant proliferation in the number of wireless applications that have been deployed, and along with the more traditional services, this has placed a significant amount of pressure on sharing the available radio spectrum.

Use of the RF spectrum is regulated by governmental entities in most countries. Currently, there are dedicated or licensed portions as well as unlicensed portions of the communications spectrum. Certain bands of the spectrum may be overloaded, such as cellular network bands, while other bands may be underused, such as television and radio broadcast bands. For example, because the unlicensed bands of the spectrum may be accessed freely, these bands tend to be heavily used. In contrast, recent studies indicate that only a small portion of the licensed (regulated) bands is being used. For example, a town may have only a few television stations or a radio or TV station may cease broadcasting at a certain time of day. Until recently, non-licensed users were prevented from using such underused bands of the spectrum.

This, together with the evolution of the TV broadcast from analog to digital, had lead regulatory bodies in some countries to open up some bands of the RF spectrum to secondary users, provided such secondary users avoid interference with primary users. In the United States, the Federal Communication Commission (FCC) mandated transition from analog to digital television by June 2009, which resulted in all full-power TV broadcast be consolidated below channel 52. As each TV station operating in a certain geographic region/area uses only a limited number of channels from the TV band, some digital channels remain unused in the respective area: this locally available spectrum is called "white space".

Few developments are underway with a view to creating a regulated environment for using the available TV spectrum.

In response to a Notice of Proposed Rule Making (Notice) issued by the U.S. FCC in May 2004, which proposed to allow unlicensed operation in the TV bands at locations where frequencies are not in use by licensed services, the IEEE created in October 2004 the Wireless Regional Area Networks Working Group. The mandate of this Working Group is to develop a new standard, called IEEE 802.22 for operation of license-exempt devices on a non-interfering basis in spectrum that is allocated to the TV Broadcast Service. Draft v3.0 of the standard is now available.

At the same time, the IEEE 802.19 Wireless Coexistence Working Group has begun developing standards for coexistence between wireless standards of unlicensed devices. These standards will define recommended wireless coexistence metrics and methods for computing them, as well as various wireless coexistence scenarios. The group is debating topics like: information needed from TV white space devices, also known as TVBD, and networks, interfaces and communication between TVBDs and TVBD networks, coexistence mechanisms, coexistence decision making entities, decision making topologies.

In November 2008, the FCC released its Second Report and Order (FCC R&O) with rules allowing a new class of unlicensed consumer electronics products to operate in the broadcast television spectrum at locations where the spectrum is not being used by licensed services. This unused TV spectrum is often termed "white space". These forthcoming products have previously been referred to as white space devices, but are now called TV band devices (TVBDs).

The new FCC R&O rules allow the development of new and innovative types of unlicensed devices that provide broadband data and other services for businesses and consumers without disrupting the incumbent television and other authorized services that operate in the TV bands.

The new rules provide for operation of two types of unlicensed TVBD, namely fixed devices and personal/portable devices. Thus, Title 47: "Telecommunication Part 15 Radio Frequency devices", Subpart H—Television Band Devices" sets out the regulations for TVBDs which are unlicensed intentional radiators operating on available channels in the broadcast television frequency bands at 54-60 MHz, 76-88 MHz, 174-216 MHz, 470-608 MHz and 614-698 MHz bands. This document defines a "fixed device" as a TVBD that transmits and/or receives radio-communication signals at a specified fixed location using relatively high power and could be used to provide a variety of services including wireless broadband access in urban and rural areas. The fixed devices may operate as part of a system, transmitting to one or more fixed TVBDs or to personal/portable TVBDs. The personal/portable devices will use relatively low power and could, for example, take the form of devices such as Wi-Fi-like cards in laptop computers or wireless in-home local area networks (LANs).

This Document also defines a Mode II operation for a personal/portable TVBD, whereby the device determines the available channels at its location using its own geo-location and TV bands database access capabilities. TVBDs operating in Mode II may function as master devices. Devices operating in Mode I do not require use of a geo-location capability or access to the TV bands database, and require operation under control of a master device (they operate in client mode).

Initially, the idea was for all TVBDs to use spectrum sensing to detect which frequencies are in use and avoid them, but FCC ruled that spectrum sensing is not sufficient by itself to enable unlicensed devices to reliably determine the TV channels that are available for use at a location and now the plan is to combine a database service with spectrum sensing to protect incumbent services from interference from TVBDs. Also, a fixed or a personal portable unlicensed TVBD should access the database over the Internet and provide it with its location. The database system will then determine which television channels are available for use by the TVBD at that location, based on the information in the database, and return a list of these channels to the respective TVBD. The database should also register unlicensed fixed devices and record appropriate information about them, including the devices location and user contact information. In addition, unlicensed fixed devices and unlicensed personal portable devices operating in Mode II are required to use spectrum sensing to identify any digital or analog TV services, wireless microphone activity and any other protected signals that use the TV spectrum in the respective geographical area but do not appear in the database.

The information stored in this database would include the numbers of the protected channels, geo-location and channel contours of each TV tower and each stadium or a site using wireless microphones, and terrain elevation for the service region, maximum EIRP for the licensed TV channel, antenna height and gain, propagation models, interference scenarios. The information in the database would also include identification and geo-location information for the fixed TVDBs in the service area, their transmission power and operating channels, etc. It is expected that the type and extent of information stored in the database will be agreed upon by broadcasters, regulators and service providers, and will be updated regularly. The database should be pulled by the TVBDs or pushed to the TVBDs. The term "system information" is used to designate the information stored in the informational database.

The TVBD providers and devices, which are the database users, shall provide their configuration/transmission parameters to the database, together with any sensed data regarding the presence of a primary service they may have identified (sensed, detected) in that area. As users of the database, these entities must be validated (authentication and authorization) upon requesting database access. The information uploaded by these users is submitted to a validation and security verification process; the broadcasters and regulators shall confirm the data before updating the database. TVBD, particularly base station transceivers (BTS) and access points (AP), shall access the database to acquire the protected channel information, available channel information, interference status, power limitation data, etc, which is used for configuring the spectrum usage, and for conveying this information to any TV band device under their control. Each time when an AP or BTS receive updates from the database, these TVBD shall reconfigure the spectrum information quite fast (e.g. within 30 seconds). For example, when a broadcaster decides to use a channel, that channel must be cleared within this time frame.

Broadcasters and regulators may push the updates to all TVBDs in the service area either directly or via the TV WS service providers. Preferably, the TV WS service providers shall provide an anchor point where the database server can push data to. Broadcasters and regulators may push/update a particular data type to clear a channel or multiple channels of a region within a certain amount of time delay.

Databases with information for wireless communication networks are known. One example of such a database is disclosed in U.S. Pat. No. 6,301,477 (Lennert, et al.) issued on Oct. 9, 2001, entitled "Method for creating and modifying similar and dissimilar databases for use in GSM wireless configurations for telecommunication systems". Lennert et al. disclose an automatic database creation and modification method used in three circumstances: during the testing of a network device (e.g. a switch), when the device is sold to a customer and needs to be configured with customer's specifications and when a device experiences a full failure. Under any of these circumstances, a new database is created and is populated with data retrieved from preexisting source GSM wireless network databases. The data mentioned in the patent includes information concerning home location register, base station interface, location areas, geographical locations, operations maintenance and billing center interfaces, visitor location register, etc.

Spectrum Bridge Inc., website: http://spectrumbridge.com, is one of the active companies involved in the TV white space database development. The company views the TV spectrum as an asset which can be traded among users and developed software products to enable this functionality. The proposed solution is a centralized database service, called Universal Spectrum Access, which can be used as an add-on feature to help existing wireless communication equipments. The service takes a "coordination of network resources and operations" standpoint. The database contains information from FCC's Universal Licensing System and has additional information such as spectrum availability, location and bandwidth, geographic information such as spectrum license boundaries, census block sizes, tower locations and protected incumbent zones, census and market population data, spectrum service rules. The service issues spectrum certificates to users on specific frequency, power output, channel plan and time period.

In a document entitled: "Proposal by Google Inc. to provide a TV band device database management solution" submitted in January 2010 before the Federal Communication Commission, ET Docket No. 04-186, Google Inc. proposes the basic functional architecture for a TV white space (TVWS) database, including data repository, registration, and determination of available channels/query process. According to this proposal, the TVWS database should serve as a repository of three primary categories of information: (1) information about protected facilities, as recorded in FCC databases; (2) information about facilities that are not recorded in FCC databases but are otherwise entitled to protection provided they register with the TVWS database; and (3) identification and location information of registered Fixed and Mode II (mobile) TVBDs. Google's document includes proposals for repository and registration functions, and query functions associated with the database. The proposal also provides a basis for a process to support synchronization with other TVWS databases with a view to exchange information, on a set interval, about new, modified or deleted database records.

Although the US FCC's Second Report and Order pretty much lays out what are presumably the data fields to be used, there still doesn't seem to be a full consensus on how many entities should be recruited for the database network, what specific roles they should play and what architecture model the database should follow. FCC has not mandated a specific architecture to manage the required collection and dissemination of data needed for TVBDs. Furthermore, current proposals for a TV white space database have a centralized database approach in which all the pertinent information is stored in a central database.

SUMMARY OF THE INVENTION

The following summary is intended to highlight and introduce some aspects of the various exemplary embodiments, but not to limit the scope of the invention. Detailed descriptions of a preferred exemplary embodiment allowing those skilled in the art to make and use the inventive concepts are provided by the entire disclosure. Following meanings shall apply to all instances of each of the terms identified below, except in instances where otherwise stated or in specific instances where, from the specific context in which the term appears, a different meaning is clearly stated.

In the following description, TVBD term designates fixed and personal/portable unlicensed wireless devices operating in TV spectrum unused by licensed devices. The personal/portable devices operate in both Mode I and Mode II.

An object of the invention is to provide a method of creating and operating a TV white space management system for TV white space unlicensed applications operating in TV spectrum unused by licensed devices.

According to an embodiment of the invention, there is provided a method of managing the TV spectrum available for non-licensed applications, comprising the steps of: saving in a first data storage medium at a central database identification information and operational parameters for all licensed TV band users operating in a geographical area; saving in a second data storage medium at the central database central identification information and central operational parameters for all unlicensed TVBDs currently operating in the geographical area; for an unlicensed TVBD requesting access to the TV spectrum in the geographical area, negotiating local operational parameters with a local database; and once the unlicensed TVBD has obtained the local operational parameters from the local database, registering the unlicensed TVBD on the second data storage medium in the central database.

According to another embodiment of the invention, the method comprises creating the local database in the geographical area for serving the unlicensed TVBD and any other TVBD requesting access to the TV spectrum from a service area of the local database, the local database comprising a local database manager and a local data structure.

In accordance with still another aspect of the invention, the method provides the list of existing local databases in a service area of the unlicensed TVBD.

In accordance with still another aspect of the invention, the TVBD either associates with an existing LDB, or it creates a new LDB.

In accordance with still another aspect of the invention, the method further comprises providing the local database with local identification information of the unlicensed TVBD; obtaining at the local database operational parameters of the licensed TV band users operating in the service area of the local database; obtaining from one or more neighboring local databases local operational parameters for all unlicensed TVBDs operating in the service area of the respective neighboring local databases; determining the local operational parameters of the unlicensed TVBD based on the operational parameters of the licensed devices and the local operational parameters of the unlicensed devices, and providing the unlicensed TVBD with the local operational parameters.

In accordance with still another aspect of the invention, there is provided a central database apparatus for managing the TV spectrum available for non-licensed applications, comprising a first data storage medium storing a first data structure comprising identification information and operational parameters for all licensed TV band users operating in a geographical area; a second data storage medium storing a second data structure comprising central identification information and central operational parameters for all unlicensed TVBDs currently operating in the geographical area; an interface for communicating with the unlicensed TVBD; an interface for communicating with a local database to receive a query access address of the local database; a central database manager for updating the identification information and the operational information of the licensed TV band users in the first data structure at preset intervals or upon changes; for providing the unlicensed TVBD with the address of the local database, and for updating the central identification information and the central operational parameters of the unlicensed TVBD in the second data structure.

In accordance with still another aspect of the invention, there is provided a distributed local database apparatus for managing the TV spectrum available for non-licensed applications, comprising at least one local database wherein the local database comprises a local database manager and a data storage medium for storing a data structure for local identification information and local operational parameters for all unlicensed TVBDs currently operating in a geographical area. Each local database comprises an interface for communicating with a central database, an interface for communicating with other local databases in the geographic area, and an interface for communicating with the unlicensed TVBDs in the geographic area.

In accordance with still another aspect of the invention, the local database manager provides communication with the unlicensed TVBDs in the geographic area; communication with the central database, and communication with other local databases. The local database manager receives from the central database identification information and operational information for all licensed TV band users in the geographic area; create a data entry in the local data structure for each unlicensed TVBD in the geographic area; and receives local identification information and local operation parameters from the other local databases in the geographic area.

In accordance with still another aspect of the invention, the local database manager negotiates coexistence with the other local databases; decides on local operational parameters for the unlicensed TVBD and provides the TVBD with the local operational parameters.

In accordance with still another aspect of the invention, the local database manager registers the unlicensed TVBD with the central database and provides to the central database the query access address of the local database.

The two-level database structure disclosed by this invention enhances the protection of licensed users by enabling TVBDs to share their sensing results with each other. It also provides a simple mechanism for TVBDs to negotiate coexistence with each other and it prevents the central database from being overloaded with unlicensed user information by keeping the communication between TVBDs and CDB at a low level. It also avoids the use of a coexistence coordinator for the TVBDs, which is difficult to define and maintain.

BRIEF DESCRIPTION OF THE DRAWINGS

One or more exemplary embodiments will now be described with reference to the accompanying drawings in which.

DESCRIPTION OF THE EMBODIMENTS OF THE INVENTION

In the following description, one or more aspects utilize a two-level database structure for enabling management and control of available wireless spectrum resources in the networks using TVBDs. Accordingly, the communication spectrum is allocated between these devices while ensuring that use of this spectrum does not affect in any way operation of the licensed services such as TV broadcast and wireless microphone systems. Although the various aspects and embodiments herein described refer to various wireless implementations, it will however be appreciated that these methods and systems are also applicable to wireline transmission.

According to the various embodiments described herein, the generally accepted definitions of a spectrum and a channel may refer to both a frequency and time "spectrum," and a frequency and time "channel," respectively. The term "service area" is used for a geographical area covered by a white space network, which is specified in a local database, as it will be described later in more details.

Figure 1:
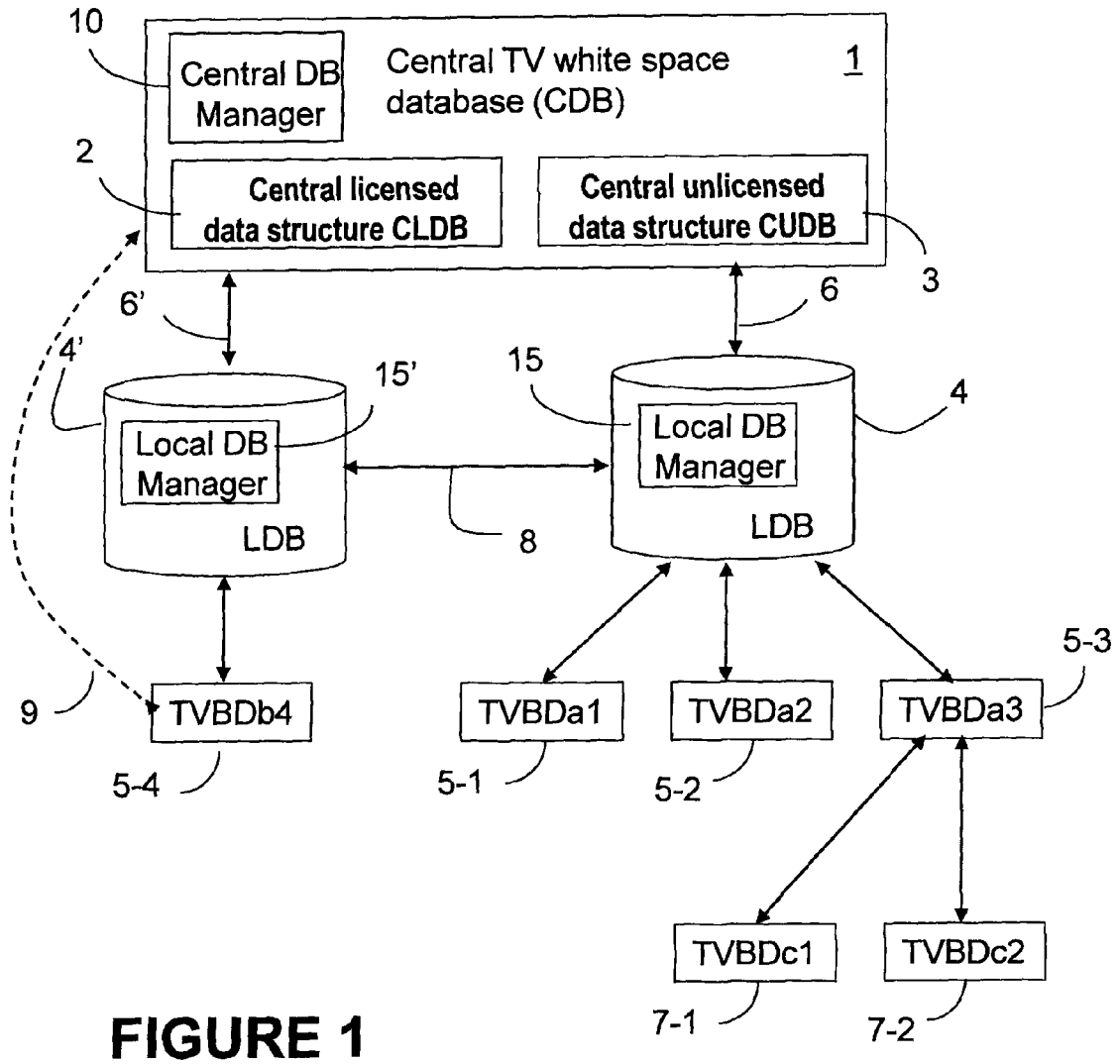
FIG. 1 illustrates a block diagram of the two-level structure of the TV white space database in accordance with one embodiment of the invention.

Referring to FIG. 1, there is shown the block diagram of an embodiment of a two-level structure of a database for devices operating in TV white space. As shown, the database is structured on two levels, comprising at the higher level a central database CDB 1, and at the lower level, the local databases LDB 4 and LDB 4'. It is to be noted that the number of local databases is not restricted to two as shown in the FIG. 1; more local databases may be provided as needed, based on the size of the service area and number of the TVBDs requesting access for spectrum availability information. The TVBDs 5-1 to 5-4 access/create the local databases at the second level for obtaining the information about which channel in the TV spectrum it can use, as it will be described in connection with FIG. 2.

The central database CDB 1 is, for example, hosted on one or on a multitude of online accessible servers. It is expected that such database servers would be provided to serve regional networks and that a regional database may also be available. CDB 1 is created in accordance with FCC requirements and serves as a repository for information relating to the networks and devices using the TV spectrum. This information can be classified into two main categories, namely information pertaining to licensed users and information pertaining to unlicensed users. According to a preferred embodiment of the invention, these two categories of information are provided on different supports: the information related to licensed users is stored in a central licensed data structure shown at 2, and information related to unlicensed users is stored in a central licensed data structure shown at 3. According to a preferred embodiment of the invention, the central licensed data structure and the central unlicensed data structure are stored on the same data storage medium. According to still another embodiment of the invention, the central licensed data structure and the central unlicensed data structure are stored on different data storage media. CLDB 2 and CUDB 3 are preferably collocated and managed by a Central Database Manager 10. According to another aspect of the invention, CLDB 2 and CUDB 3 are stored at different locations and are managed by the Central Database Manager 10.

The FCC Second R&O defines the information that has to be registered into the database for both licensed TV users and unlicensed TVDBs.

According to an aspect of the invention, central licensed database CLDB 2 includes data provided by the broadcasters and regulators, such as an identification of the available TV channels (i.e. the channel number), transmission schedules, protection contour information for the towers transmitting the licensed channels, the maximum EIRP for these TV channels, and other data elements for each licensed TV band user. The broadcasters and regulators must also regularly update CLDB 2 with any new information available to them. The identification information and operational parameters recorded in CLDB 2 are provided in accordance with FCC requirements and regulations in regards to licensed TV band users.

The central unlicensed database CUDB 3 includes central identification information and central operational parameters for all unlicensed fixed, Mode I and Mode II devices or network 5-1 to 5-4 operating in a respective region. Central identification information may include, for example, the device model and serial number, Internet address, etc. The central operational parameters include, for example, geographic location, transmission power and operating channels. Additional information such as antenna height and gain may also be provided for the fixed devices. CUDB 3 may also include interference scenarios, propagation models, terrain elevation in the service region, etc.

For example, the central identification information for a fixed TVBD includes a FCC Identifier (FCC ID) of the device; manufacturer's serial number of the device; device's coordinates (latitude and longitude); name of the individual or business that owns the device; name of a contact person responsible for the device's operation; address of the contact person; email address of the contact person; phone number of the contact person and other registered information required by FCC. The central operational parameters saved in the database CUDB 3 for each TVBD could be, for example: LDB Internet access address, referred to as query access address; transmitter locations and maximum transmission power levels; possible radiation contour.

The central identification information required by FCC Second R&O to be collected from personal/portable unlicensed TV band devices, which will not be registered and only access the database for available channels, will include: FCC Identifier (FCC ID) of the device; manufacturer's serial number of the device; device's coordinates (latitude and longitude accurate to +/−50 m).

The local databases (LDBs) 4, 4' include more detailed information in regards to the TVBDs that operate in the service area of the respective LDB. Thus, it stores detailed information on its own wireless network, including sensing results from all the TVBDs in the network equipped with spectrum sensors, as well as information about query addresses of other local databases in neighboring areas and information about licensed users in the area.

In addition, local databases may include information about possible interference between devices/networks that are at the border of the respective service area; the local databases exchange this type of information for providing the TVBDs with best services available. For example, LDB 4 informs LDB 4' that a device operating at the border of its service area uses a certain TV channel, so as to enable LDB 4' to select a different channel from the list of available channels provided by the CDB 1. Also, radiation contours for the licensed devices may be provided; for example, based on the radiation contour information for a licensed device, LDB 4 or LDB 4' may still allocate a channel used by the licensed device to a TVBDs if the contour shows that there is no interference between the two. Similarly, radiation contour information for various types of TVBDs enables reuse of a free TV channel by two neighboring TVBDs as long as they do not interfere. As a result of locally accessible information, the LDBs can exchange information to improve sensing and achieve coexistence with each other.

For example, the information provided in the LDBs includes: local registration information such as manufacturer serial number, frequency band the device can operate on; local operational parameters such as locations as geographic coordinates, identification of the maximum transmit power, actual power levels for all transmitters in its network; operating time schedule; identification of the transmission channel, channel sensing results; backup channel information; operational channel usage pattern; and list of other LDBs in the neighborhood.

FIG. 1 also shows a plurality of database users that operate in different locations, and communicate accordingly with a respective one of local databases 4 and 4'. Thus, TVBDa1 to TVBDa3, denoted with 5-1 to 5-3 attach themselves to local database LDBa 4, and TVBDb4, denoted with 5-4 communicates with local database LDBb 4'. It is to be noted that these devices are shown by way of example in FIG. 1, and the number of such devices is variable both in time and location, as well understood. Also, a TVBD shown in FIG. 1 may represent a network that serves one or more TVDB devices, or simply a TVBD such as a Mode I or Mode II device. Such an example is shown for a TVBD network 5-3 that includes TVBD devices 7-1 and 7-2.

The TVBD devices/networks 5-1 to 5-4 provide their local information for storage in the respective local databases 4, 4' and the central identification information to the central unlicensed database 3 of the CDB 1, as required by FCC regulation. TVBDs 5-1 to 5-4 may also provide additional parameters such as the identification of their local database LDB 4, 4'. It is noted that the identification of the LDB could be provided either by the respective local database, or by the TVBDs themselves. It is also to be noted that each local database comprises a local data structure and a local database manager (15, 15') which enables communication with the TVBDs for access to the database and for receiving the information about the channels available for transmission. The local data structure is saved on a data storage medium. The data storage medium could be, for example, an online server, a base station transceiver (BTS) or an Access Point (AP).

The local database manager (15, 15') also enables communication with the CDB along interface 6, 6' and with other LDBs along interface 8. The local databases also communicate with each-other, as shown at 8. For example, during the operation, an LDB may receive sensing alerts from other LDB, or new licensed user alerts from CLDB, and responds accordingly by taking this information into account when determining the channels available for use by the devices/networks is serves. The LDB manager may also use interface 8 to inquire other LDBs about the backup channel lists they use and to negotiate a backup channel scheme.

The local databases 4, 4' are created by the TV white space service providers and the TVBDs 5-1 to 5-4. Preferably, a local network has a local database LDB, as shown for TVBD 5-3 and LDB 4; LDB 4 saves information regarding TVBD devices 7-1 and 7-2 operating in that network.

In the example shown in FIG. 1, it is assumed that LDB 4 had been created and it has a number of entries populated with information regarding TVBDs 5-1 to 5-3 in the respective service area. Further, in this embodiment, when a TVBD device such as 5-4 or a TVBD network comprising a TVBD (not shown) initiates, it queries the CDB 1 by sending its transmitter location and power level along interface 6'. CLDB 2 sends to LDB 4 the licensed user operational parameters including channel, schedule, protected contours of the licensed users in the regional area of the local LDB 4'. CUDB 3 sends the query access address of other LDBs, such as LDB 4 in the proximity of the service area of LDB 4'. LDB 4' then performs negotiation with LDB 4 on coexistence by exchanging channel usage patterns along interface 8, with a view to converge to an optimal schedule for TVBD 5-4. After negotiating with LDB 4, LDB 4' decides on the operational channel, transmitter power and usage pattern for TVBD 5-4 and sends to CUDB 3 the request to register with it. Once the registration is complete, TVBD 5-4 can start the transmit/receive operation on the newly decided operational channel.

Figure 2:
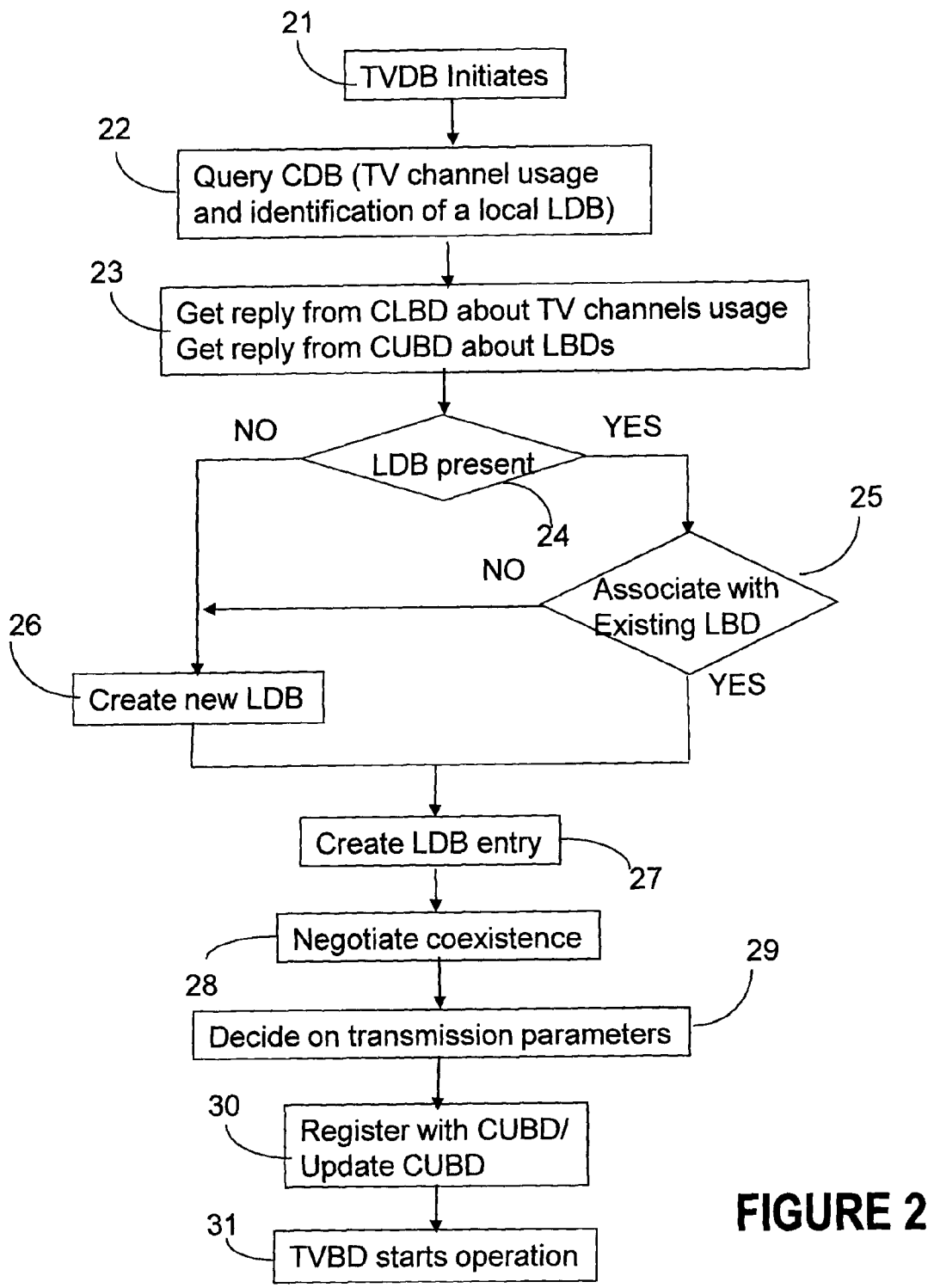
FIG. 2 illustrates the flowchart of main steps in creating and using the databases according to an embodiment of the invention.

FIG. 2 illustrates in more details the steps followed to create and use the two-level database of the invention by TVBD devices and/or TVBD networks. Referring to FIG. 2, when a TVBD device or TVBD network, for example TVBD 5-4, initiates in step 21, a query is sent to the CDB 1 to enquire on free channels in the TV band available for local use, and the existence of local LDB, as shown in step 22. The query includes at least identification and location information for the TVBD.

This communication to central database could be for example established on a backhaul connection (e.g., high frequency microwave relay, wireline or slow wireless connection such as a cell phone), shown by a dotted line 9 in FIG. 1. Upon receiving the query, CLDB 2 replies with the information related to the channels available in the service area of the TVBD device or network. Preferably, CLDB 2 replies with the operational parameters of all licensed TV band users in the service area of the TVBD device or network. CUDB 3 searches its data records to identify whether there is any local LDB in the service area of the TVBD. When the search is finished, CUDB 3 sends a reply back to TVBD comprising the query access addresses of all LDBs found to exist in the service area of TVBD. The reply is sent even if no local LDB has been found.

In step 23, the replies from CLDB and CUDB are received by the TVBD. If no LDB had been registered with CUDB for the local area of TVBD 5-4 for example, TVBD 5-4 creates LDB 4', as shown at 26, along the branch "NO" of decision block 24. LDB 4' is created at an online accessible address, which becomes the query access address for the respective service area. If at least local LDB 4 already exists, as shown by branch "YES" of decision block 24, TVBD 5-4 may decide, in step 25, to associate with an existing LDB 4. In this case, it creates a data entry in database LDB 4', as shown at step 27 along the branch "YES" of decision block 25. If device 5-4 decides however to create a database, as shown by branch "NO" of decision block 25, the database is created as shown in step 26. The address of the new LDB can be selected locally by the TVBD device or TVBD network or, alternatively, it can be provided by CUDB 3. Once the LDB is created, TVBD 5-4 sends its own information to the selected LDB which adds a data entry for TVBD 5-4, step 27.

If there are other TVBD devices in the same geographic area, the new LDB or the associated LDB starts a negotiating protocol 28 with neighboring LDBs for coexistence in the unused TV spectrum. The two-level database structure provides a simple mechanism for TVBDs to negotiate coexistence with each other and advantageously avoids the use of a coexistence coordinator for the TVBDs, which is difficult to define and maintain.

After negotiating with the other local databases, LDB decides on the operational channel, transmitter power and usage pattern for the new operating device/or network, as shown in step 29. If a new LDB is created, the new LDB registers with CUDB; alternatively if the TVBD is associated with an existing LDB, the existing LDB updates its information with CUDB, as shown in step 30. The TVBD device can start the operation, in step 31, on the decided operational channel.

A mode I personal/portable TVBD will operate under the control of either a Mode-II personal/portable TVBD or a Fixed TVBD. Therefore, the creation of an LDB or obtaining a database entry in an existing LDB is the responsibility of the Fixed or Mode-II TVBD.

During the operation, changes may happen in a TVBD network. For example, a new transmitter may start operation, or an existing transmitter may stop operation, or the transmission power may change for one or more transmitters. In such a case, the LDB repeats steps 28-30. It may not need to renegotiate with other LDBs if its channel usage does not change, for example, if a new transmitter starts transmission within the same time schedule as before.

During the operation, an LDB may receive a coexistence query from a new TVBD, for example a TVBD 7-1 connecting to TVBD network 5-3. Upon receiving the new coexistence query, the LDB 4 serving TVBD network 5-3, exchanges information with LDB 4' for a coexistence scheme.

The proposed database structure enables TVBDs to determine their operation patterns to avoid interference to licensed users, it enables TVBDs to share sensing results to achieve better protection of licensed users; it also enables TVBDs to negotiate coexistence without the involvement of any coordinator. The proposed database structure also avoids heavy computation and overloading of the central database, and keeps the communication between TVBDs and CDB at a low level.

The embodiments of the present invention in which an exclusive property or privilege is claimed are defined as follows:

1. A method of managing a TV spectrum available for non-licensed applications, comprising the steps of:
   i) saving, in a first data storage medium at a central database, identification information and operational parameters for licensed TV band users operating in a geographical area;
   ii) saving, in a second data storage medium at the central database, central identification information and central operational parameters for unlicensed TVBDs currently operating in the geographical area;
   iii) negotiating local operational parameters with a local database for an unlicensed TVBD requesting access to the TV spectrum in the geographical area; and
   iv) registering the unlicensed TVBD on the second data storage medium in the central database once the unlicensed TVBD has obtained the local operational parameters from the local database.

2. The method as claimed in claim 1, wherein step iii) further comprises the steps of:
   a) creating the local database in the geographical area for serving the unlicensed TVBD and any other TVBD requesting access to the TV spectrum from a service area of the local database, the local database comprising a local database manager and a local data structure; and
   b) associating a query access address to the local database serving the unlicensed TVBD.

3. The method as claimed in claim 2, wherein step a) comprises the sub-steps of:
   providing by CUDB to the unlicensed TVBD the online address of the local database manager operating for the service area of the unlicensed TVBD;
   connecting the unlicensed TVBD to the local database manager;
   creating the local data structure and the query access address of the local database; and
   setting-up an entry in the local data structure by the local database manager.

4. The method as claimed in claim 2, wherein step a) comprises the sub-steps of:
   providing by the unlicensed TYBV the online address of the local database manager operating for the service area of the unlicensed TVBD; connecting the unlicensed TVBD to the local database manager;
   creating the local data structure and the query access address of the local database; and
   the local database manager setting-up an entry in the local data structure.

5. The method as claimed in claim 2, wherein the step iii) further comprises the steps of:
   providing the local database with the local identification information of the unlicensed TVBD;
   obtaining at the local database operational parameters of the licensed TV band users operating in the service area of the local database;
   obtaining from one or more neighboring local databases the local operational parameters for all unlicensed TVBDs operating in the service area of the respective neighboring local databases;
   determining the local operational parameters of the unlicensed TVBD based on the operational parameters of the licensed devices and the local operational parameters of the unlicensed devices; and
   providing the unlicensed TVBD with the local operational parameters.

6. The method as claimed in claim 2, wherein step iv) comprises the step of transmitting the central identification information and the central operational parameters of the unlicensed TVBD to the central database together with the query access address of the local database.

7. The method as claimed in claim 1, wherein the step iii) further comprises the steps of:
   providing with at least one local database query access address in a service area of the unlicensed TVBD, the local database comprising a local database manager and a local data structure;
   connecting the unlicensed TVBD to the local database manager of the local database; and
   setting-up an entry in the local data structure by the local database manager.

8. The method as claimed in claim 1, wherein registration parameters comprise:
   FCC Identifier (FCC ID) of the device;
   manufacturer's serial number of the device;
   device's coordinates (latitude and longitude);
   name of the individual or business that owns the device;
      name of a contact person responsible for the device's operation;
   address of the contact person;
   email address of the contact person;
   phone number of the contact person; and
   the query access address of the local database.

9. The method as claimed in claim 1, wherein the local operational parameters for the unlicensed TVBD comprise identification of a transmission channel in the TV spectrum allocated to the unlicensed TVBD.

10. The method as claimed in claim 1, wherein the local operational parameters for the unlicensed TVBD comprise an identification of the maximum transmit power to be used by the unlicensed TVBD while operating in the service area of the local database.

11. The method as claimed in claim 1, wherein the local operational parameters for the unlicensed TVBD comprise an identification of the transmission time allocated to the unlicensed TVBD while operating in the service area of the local database.

12. The method as claimed in claim 1, wherein the local operational parameters for the unlicensed TVBD comprise spectrum sensing measurements performed by the unlicensed TVBD.

13. The method as claimed in claim 1, wherein the central identification information for the unlicensed TVBD currently operating in the geographic area comprises one or more of:
   FCC Identifier (FCC ID) of the device;
   manufacturer's serial number of the device;
   device's coordinates (latitude and longitude);
   name of the individual or business that owns the device;
      name of a contact person responsible for the device's operation;
   address of the contact person;
   email address of the contact person; and
   phone number of the contact person.

14. The method as claimed in claim 1, wherein the central operational parameters for the unlicensed TVBD currently operating in the geographic area include the query access address of the local database.

15. The method as claimed in claim 1, further comprising updating periodically the central identification information and central operational parameters in the second data storage medium at the central database for all unlicensed TVBD currently operating in the geographical area.

16. The method as claimed in claim 1, further comprising the steps of updating periodically the identification information and the operational parameters stored in the first data storage medium at the central database for all licensed TV band users currently operating in the geographical area.

17. The method as claimed in claim 1, wherein step iv) further comprises the step of transmitting from the local database to the central database at least the central identification information and the central operational parameters of the unlicensed TVBD, and a query access address of the local database.

\* \* \* \* \*